US008365158B2

(12) United States Patent
Bolanowski

(10) Patent No.: US 8,365,158 B2
(45) Date of Patent: Jan. 29, 2013

(54) UPDATE OF SOFTWARE IN A PORTABLE RADIO COMMUNICATION EQUIPMENT

(75) Inventor: Wladyslaw Bolanowski, Bara (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1313 days.

(21) Appl. No.: 11/572,594

(22) PCT Filed: Jun. 22, 2005

(86) PCT No.: PCT/EP2005/006751
§ 371 (c)(1),
(2), (4) Date: Jan. 24, 2007

(87) PCT Pub. No.: WO2006/012948
PCT Pub. Date: Feb. 9, 2006

(65) Prior Publication Data
US 2008/0059958 A1    Mar. 6, 2008

Related U.S. Application Data

(60) Provisional application No. 60/601,239, filed on Aug. 13, 2004.

(30) Foreign Application Priority Data

Aug. 5, 2004 (EP) ..................................... 04018595

(51) Int. Cl.
*G06F 9/44* (2006.01)
(52) U.S. Cl. ....................................................... 717/168
(58) Field of Classification Search .................. None
See application file for complete search history.

(56) References Cited

U.S. PATENT DOCUMENTS

| 5,579,522 | A | 11/1996 | Christeson et al. |
| 6,198,946 | B1 | 3/2001 | Shin et al. |
| 6,665,089 | B1 * | 12/2003 | Austin et al. ............... 358/1.18 |
| 2002/0137502 | A1 * | 9/2002 | Cronin et al. ............... 455/419 |
| 2003/0125927 | A1 * | 7/2003 | Seme ............................. 704/3 |
| 2003/0143991 | A1 | 7/2003 | Minear et al. |
| 2003/0182414 | A1 * | 9/2003 | O'Neill ....................... 709/223 |

(Continued)

FOREIGN PATENT DOCUMENTS

| EP | 0 966 137 A | 12/1999 |
| JP | 06-266552 A | 9/1994 |

(Continued)

OTHER PUBLICATIONS

International Search Report for corresponding Application No. PCT/EP2005/006751 mailed Aug. 29, 2005.

*Primary Examiner* — Wei Zhen
*Assistant Examiner* — Adam R Banes
(74) *Attorney, Agent, or Firm* — Renner, Otto, Boisselle & Sklar, LLP

(57) ABSTRACT

The present invention relates to a portable radio communication equipment (1) for a wireless communication system, with a download means for downloading from an external server (10) during a first operational state of the equipment (1) update information for updating software of the equipment (1), a flash memory (4) for storing the downloaded update information and an update means for starting and controlling during a second operational state of the equipment (1) the updating process according to the update information stored in the flash memory (4), characterized in that the download means during said first operational state obtains an information text containing information for a user on the updating process, adapts the information text to the settings of the equipment (1) and stores the adapted information in the flash memory (4) and that the update means when starting the updating process and during said second operational state displays the adapted information to the user. Further, the present invention relates to a method for updating software in such an electronic equipment.

13 Claims, 3 Drawing Sheets

U.S. PATENT DOCUMENTS

| | | | | |
|---|---|---|---|---|
| 2004/0015941 A1* | 1/2004 | Sekine | | 717/168 |
| 2004/0150647 A1* | 8/2004 | Aleksic et al. | | 345/555 |
| 2004/0218045 A1* | 11/2004 | Bodnar et al. | | 348/207.1 |
| 2004/0225873 A1* | 11/2004 | Diaz | | 713/1 |
| 2005/0060378 A1* | 3/2005 | Girard et al. | | 709/206 |

FOREIGN PATENT DOCUMENTS

| | | |
|---|---|---|
| JP | 08-331293 A | 12/1996 |
| JP | 11-225359 A | 8/1999 |
| JP | 2000-207215 A | 7/2000 |
| JP | 2002-244874 A | 8/2002 |
| JP | 2003-241924 A | 8/2003 |
| KR | 2004/0037976 A | 5/2004 |
| RU | 2155372 C2 | 8/2000 |
| WO | 96/24231 A1 | 8/1996 |
| WO | 03/107700 | 12/2003 |

* cited by examiner

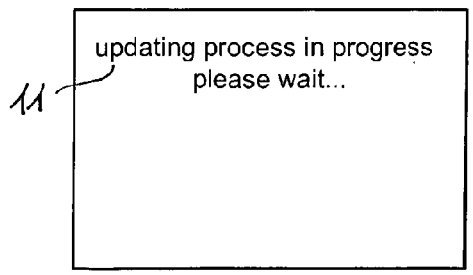
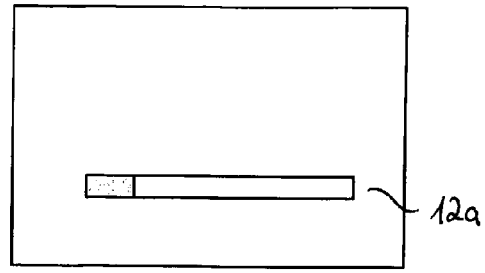
Fig. 3a　　　　　　　　　Fig. 3b
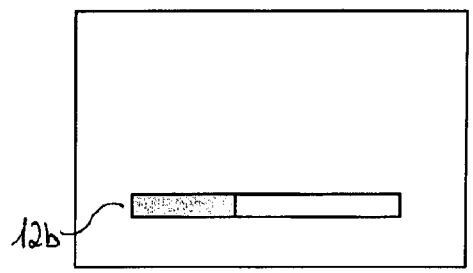
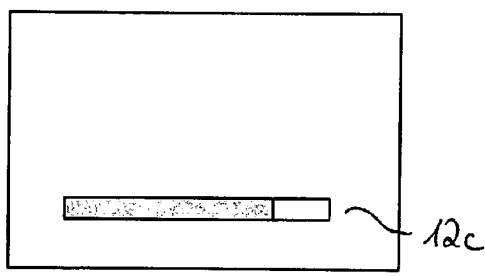
Fig. 3c　　　　　　　　　Fig. 3d
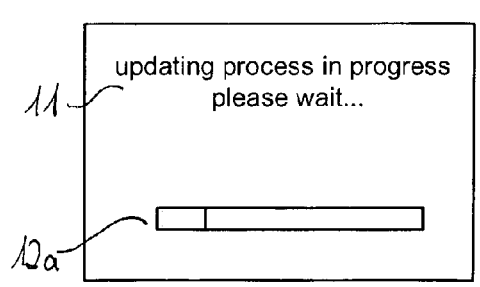
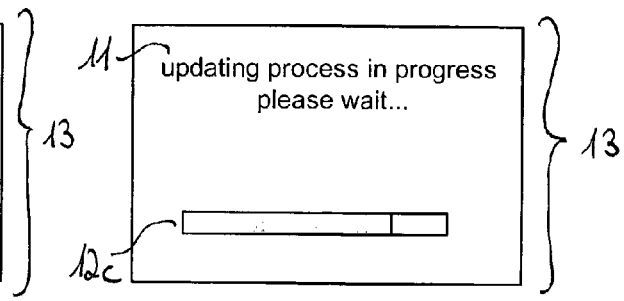
Fig. 3e　　　　　　　　　Fig. 3f

UPDATE OF SOFTWARE IN A PORTABLE RADIO COMMUNICATION EQUIPMENT

RELATED APPLICATIONS

This application claims the benefit of U.S. Provisional Application No. 60/601,239 and European Patent Application No. EP 04018595.1.

TECHNICAL FIELD OF THE INVENTION

The present invention relates to a portable radio communication equipment for wireless communication. Specifically, the present invention relates to the problem of updating the software of a communication equipment and at the same time providing a feedback to the user regarding the progress of the updating process.

DESCRIPTION OF RELATED ART

Future radio communication equipments for wireless communication, such as mobile telephones, pagers, personal digital assistants, electronic organisers and so forth will be able to request and receive an update of the software over the air from an external server. For such a Firmware update Over The Air (FOTA) the electronic equipment has to be switched in a very basic operational mode in order to enable an updating of the software. In this basic mode, no operating system is launched and only a very basic graphical driver is available. Nevertheless in this phase there is a need to provide the user with information regarding the progress of the updating process. This feedback may be a progress bar and/or a textual message.

SUMMARY

The general problem with the portable radio communication equipments for wireless communication as outlined above is that for updating the equipment is switched into a basic mode where it is hardly possible to provide a textual information to the user as there are several problems that arise. For example, the text has to be in the language that has been chosen by the user of the electronic equipment. Further, the text itself has to be formatted by using some text font definition. Those features are hard to support in the very basic state of the equipment. Further, the text itself might be a subject for update and modification and therefore a text feature can be hardly supported in the updating state and in the basic mode of the communication equipment.

The object of the present invention is therefore to provide a portable radio communication equipment for wireless communication as well as a method for updating software in such an electronic equipment for wireless communication which allow a textual feedback to the user during a software updating process of the electronic equipment.

The above-mentioned object is achieved by a portable radio communication equipment for wireless communication according to claim 1.

The portable radio communication equipment for wireless communication according to the present invention comprises a download means for downloading update information for updating the software of the equipment from an external server during a first operational state of the equipment, a flash memory for storing the downloaded update information and an update means for starting and controlling during a second operational state of the equipment the updating process according to the update information stored in the flash memory.

Hereby, the download means during said first operational state obtains an information text containing information for a user on the updating process, adapts the information text to the settings of the equipment and stores the adapted information in the flash memory and the update means when starting the updating process and during said second operational state displays the adapted information to the user.

The above-mentioned object is further achieved by a method for updating software according to claim 8.

The method for updating software in a portable radio communication equipment for wireless communication according to the present invention comprises the steps of downloading update information for updating software of the equipment from an external server during a first operational state of the equipment, storing the downloaded update information in a flash memory and starting and controlling during a second operational state of the equipment the updating process according to the update information stored in the flash memory.

The method hereby further comprises the steps of obtaining during said first operational state an information text containing information for a user on the updating process, adapting the information text to the settings of the equipment and storing the adapted information in the flash memory and displaying the adapted information to the user when starting the updating process during said second operational state.

By obtaining the information text during the first operational state and adapting it in a way, that the update means can access it during the updating process and during the second operational state, the information text can be prepared and adapted in a way, so that it can be provided to the user during the updating process in order to give the user a feedback on the progress of the updating process.

In the context of the present application and the present invention, the term "portable radio communication equipment" includes all equipment such as mobile telephones, mobile cell phones, pagers, personal digital assistants, communicators, i.e. electronic organisers, smartphones or the like. The term "wireless communication" relates to any kind of communication or telecommunication system which enables the wireless transfer of information. Although the present invention is mainly dealing with the receipt of information, it is to be noted that the electronic equipment and the method according to the present invention are not exclusively limited to the receipt of information but may in a practical application also enable the transmission of information in a wireless communication system.

It should be emphasised that the term "comprises/comprising" when used in this specification is taken to specify the presence of stated features, integers, steps or components but does not preclude the presence or addition of one or more other features, integers, steps, components or groups thereof.

Advantageously, the first operational state of the equipment is the standard mode of the equipment providing all functionalities and the second operational state of the equipment is the basic mode of the equipment providing only few functionalities.

Advantageously, the download means adapts the information text to the language of the electronic equipment by determining the language of the equipment and obtaining the information text in the determined language.

The download agent preferably obtains the information text from a text database integrated in a file storage section of the equipment.

Preferably, the download means adapts the information text to the font definition of the equipment.

Further preferably, the download means on the basis of the adapted information text generates a main display image and compresses the main display image and stores the compressed main display image in the flash memory.

Preferably, the update means accesses the flash area and provides the main display image to the user.

BRIEF DESCRIPTION OF THE DRAWINGS

Embodiments of the invention will now be described, by way of example only, with reference to the accompanying drawings in which:

FIG. 2 is a flow chart showing schematically the process steps according to the method of the present invention and FIG. 3a to 3f are schematic views of different display images during the updating process.

DETAILED DESCRIPTION OF EMBODIMENT

Figure 1:
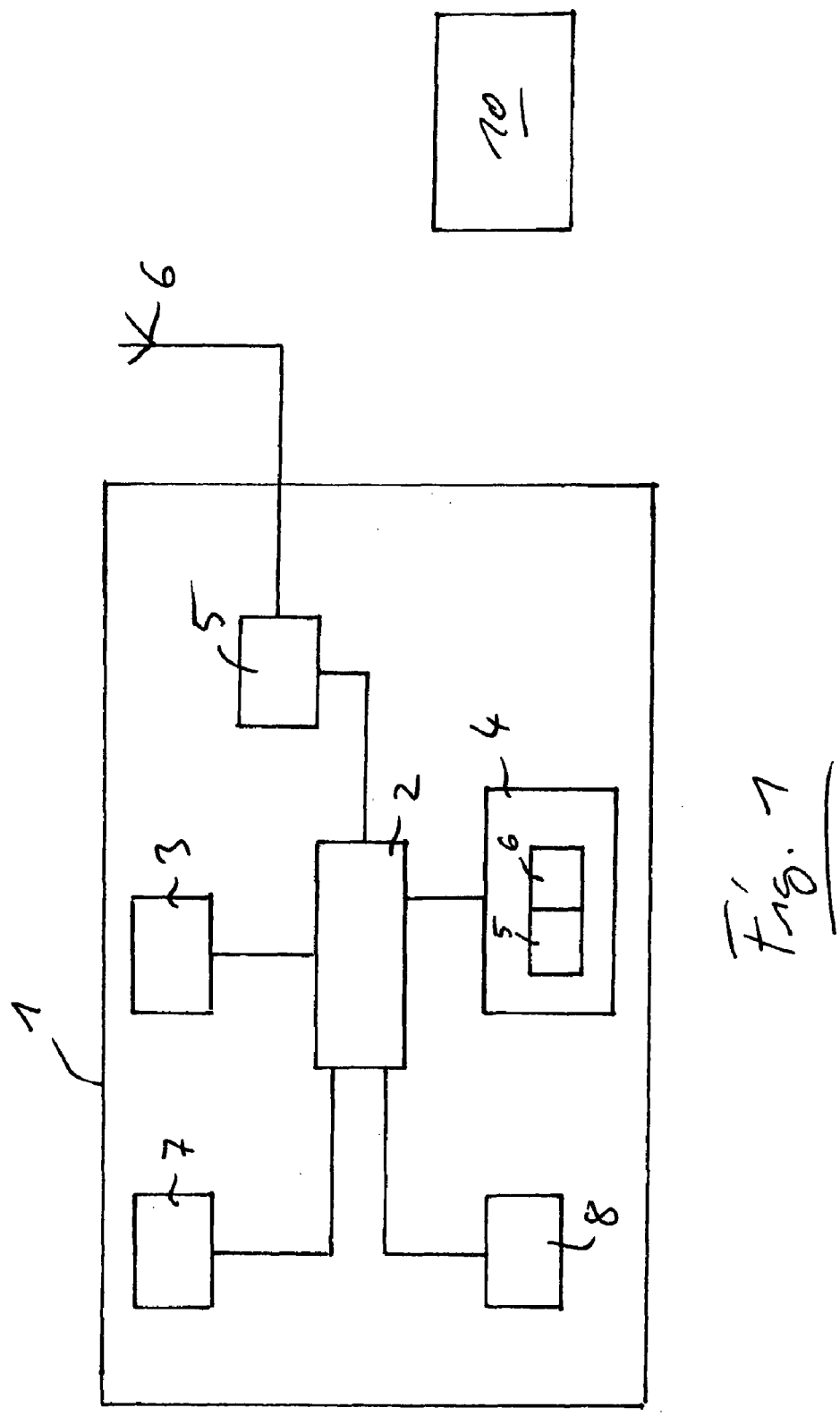
FIG. 1 is a block diagram showing schematically the elements of the system.

FIG. 1 shows a schematic block diagram of a portable radio communication equipment 1 according to the present invention. The portable radio communication equipment 1 is adapted to communicate with an also shown server 10, for example via a base station by means of a wireless communication system and comprises the necessary elements for such a communication, as a high frequency section 5 and an antenna 6. By means of the antenna 6 and the high frequency section 5 connected with the antenna 6, the portable radio communication equipment 1 is able to transmit and receive singles in a wireless communication system under the control of a processor 2. The processor 2 is for example a base-band processor and can be implemented in any known or future technology, such as a combination of hardware and software depending on the required application area of the portable radio communication equipment 1.

The processor 2 is connected to and/or comprises a random access memory 3 (RAM) and a flash memory 4. The flash memory 4 comprises a raw storage section 5 for storing executable software code and a file system storage section 6 for storing file information. The raw storage section is usually a ROM (read only memory) section and can additionally comprise additional space for storing special data.

The portable radio communication equipment 1 further comprises all necessary elements features for a normal operation (such as a display 7, input means 8), as for example a keyboard, jog-dial or the like and so forth. Features which are not important for the understanding of the present invention are omitted for the sake of clarity. Further, it has to be noted that the wireless communication system in which the portable radio equipment 1 according to the present invention is able to communicate in is for example the GSM, UMTS or any other suitable present or future radio communication system.

The file system storage section 6 serves for the permanent or long time storage of any data or any information relating to the functionalities of the communication equipment 1. This may be the operating system, programs, applications, data input by the user and so forth. In the file system storage section 6, also the settings selected either automatically or by user input are stored, such as the language of the communication equipment 1, the font definition of displayed text and the like. The RAM 3 serves for the volatile storage of data and/or software code during the operation process. The raw storage section 5 serves as a boot section for the communication equipment 1 and comprises data for booting the communication equipment 1 and for enabling the communication equipment 1 to operate in a basic mode, that is in a mode where no operating system is launched and where only a few functionalities are available.

In general the Firmware upgrading Over The Air (FOTA) technology makes it possible to send software upgrades over the air or even via a wired connection. The main component hereby is the ability to create a difference (FOTA delta) between two software versions and compress this difference to be compact enough for sending over the air to the mobile equipment. Typically, the difference is 1-10% of the total size of the software.

The FOTA delta is created in a computer somewhere else and contains information about the difference between the actual software version of the communication equipment 1 and the new software version.

Further, a download agent stored in one of the storage sections of the flash memory 4 is able to set up a connection to the external server 2 and supports the request and download of software update information, e.g. a FOTA delta from the server 2 to the equipment 1. The download can be performed via the wireless communication system in which the equipment is usually communicating, e.g. the GSM, UMTS or any other suitable system, or via another wireless system, e.g. Bluetooth, Infrared or the like, or via a wired connection to the server. After the download of the update information the download agent stores the received update information in one of the storage sections of the flash memory 4. Further, the download agent according to the present invention obtains an information text for providing a feedback to the user during the updating process. Such an information text can have the wording "update process in progress", "please wait . . . " or the like. The download agent stores all the downloaded and obtained information and data needed for the update process in one of the storage section of the flash memory 4.

An update agent stored in one of the storage sections of the flash memory 4 is responsible for executing the updating of the software of the equipment 1. The update agent therefore accesses download software update information stored in the flash memory 4 and updates the software in raw storage section 5. The update agent further displays the information providing a feedback about the updating process to the user. The download agent and the update agent are pieces of software.

Hereby, the first part of the whole process, that is downloading the software update information, obtaining the information text and storing of the information is accomplished during a first operational state of the communication equipment 1. This first operational state is the normal operating mode of the equipment 1 with the operating system launched and all functionalities available.

During the second part of the whole process starting with the launching of the update agent the electronic equipment 1 is relaunched into a second operational state, where no operating system is launched and only few functionalities are available. After completion of the update process the update agent relaunched the electronic equipment 1 with the new software and the communication equipment 1 is then again operating in the first operational state.

FIG. 3a to 3f show schematic views of the different displays providing a feedback to the user during the software updating process. Hereby, the obtained information text is shown as the main display image 11 during the whole updating process. Further, it is possible to also show progress bar display images 12a, 12b, 12c graphically showing the actual state of the updating process. The main display image 11 and the progress bar display images 12a, 12b, 12c can then be shown in a combination as a display image 13 during the updating process.

Figure 2:
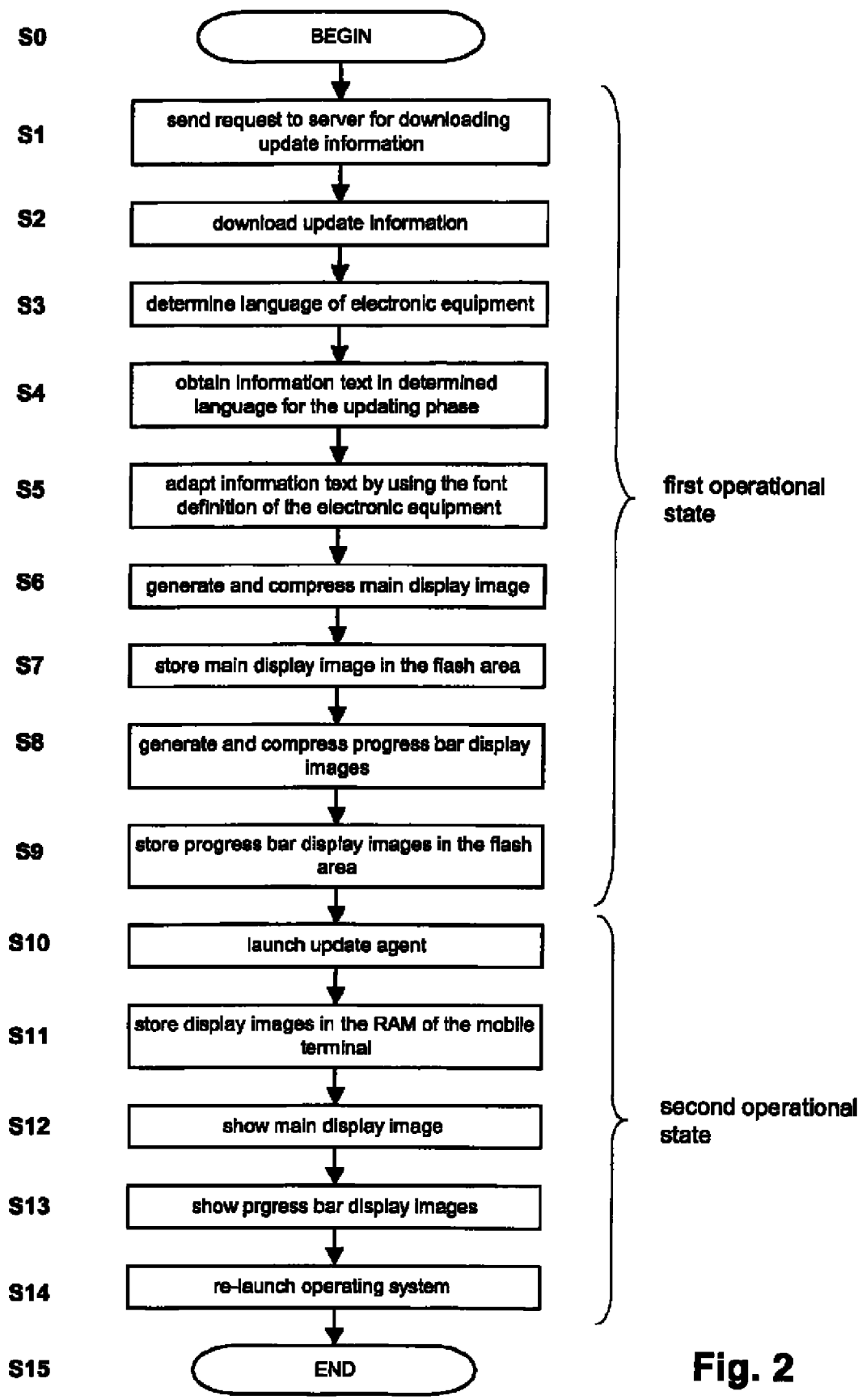

FIG. 2 is a flowchart showing the steps of the process in detail. The process begins with step S0 e.g. with switching on the communication equipment 1. In the next step S1 the download agent sends a request to the server 10 for downloading the update information. This request can either be generated by the user or automatically by the network. In the next step S2 the update information 3 is downloaded by the download agent from the server 10.

In step S3 the download agent by accessing the file storage section 6 of the communication equipment 1 determines the language of the equipment 1 selected by the user and stored in the settings in the file storage section 6. The download agent in step S4 then obtains an information text in the language determined in step S3 for providing information on the updating process to the user. Hereby, the information text is obtained from a text database integrated in the file storage section 6 of the equipment 1. In step S5 the download agent adapts the obtained information text by using the font definition of the equipment stored in the file storage section 6. Hereby, it is also possible to use background definitions if needed. In the next step S6 the adapted information text is generated as a bitmap image (main display image) and is compressed. The main display image 11 is in step S7 then stored in the raw storage section of the flash memory 4.

As an option in step S8 progress bar display images 12a, 12b, 12c can be generated in order to show the user graphically the progress of the updating process. In step S9 the progress bar display images 12a, 12b, 12c are then also compressed and stored in the flash memory 4.

The steps S1 to S9 are all executed in a first operational state of the electronic equipment 1 as explained above.

In step S10 the update agent is launched. Hereby, the operational state of the electronic equipment is changed from the first operational state to the second operational state. In step S11, the update agent accesses the raw storage section retrieves, decompresses and stores the display image 13, that is the main display image 11 and the progress bar display images 12a, 12b, 12c in the RAM 3. The main display image 11 in step S12 and the progress bar display images 12a, 12b, 12c in step S13 can the be shown to the user and thereby during the updating process give a feedback on the progress. After the completion of the updating process the update agent relaunches the communication equipment 1 with the new software. The process in step S14 ends, e.g. with switching off the equipment 1.

After relaunching the equipment 1 is again in the first operational state and all functionalities are available for the user.

The invention claimed is:

1. A portable radio communication equipment for a wireless communication system comprising:
   a downloader for downloading from an external server, during a first operational state of the portable radio communication equipment, update information for updating software of the portable radio communication equipment, the update information being incremental update information downloaded by the downloader over a wireless interface;
   a flash memory configured to store the downloaded update information and having a raw storage section configured to store executable software code and a file system storage section different from said raw storage section; and
   an updater for starting and controlling, during a second operational state of the portable radio communication equipment, an updating process according to the update information stored in the flash memory, wherein
   the downloader, during said first operational state, is configured to obtain an information text containing information for a user on the updating process, to adapt the information text to the settings of the portable radio communication equipment using data retrieved from said file system storage section, to generate a main display image at the portable radio communication equipment such that the generated main display image represents the adapted information text, to compress the main display image, and to store the compressed main display image in the flash memory before the adapted information text is displayed, and
   the updater, when starting the updating process and during said second operational state, is configured to display the main display image with the adapted information text to the user.

2. The portable radio communication equipment according to claim 1,
   wherein the first operational state of the equipment is a standard mode of the equipment providing all functionalities and the second operational state of the equipment is a basic mode of the equipment providing only few functionalities.

3. The portable radio communication equipment according to claim 1,
   wherein the downloader is configured to determine a language of the equipment and obtain the information text in the language that was determined.

4. The portable radio communication equipment according to claim 1,
   wherein the downloader is configured to obtain the information text from a text database integrated in a file storage section of the flash memory of the equipment.

5. The portable radio communication equipment according to claim 1,
   wherein the downloader is configured to adapt the information text to a font definition of the equipment.

6. The portable radio communication equipment according to claim 1,
   wherein the updater is configured to access the raw storage section of the flash memory and to display the main display image to the user.

7. A method for updating software in a portable radio communication equipment for wireless communication, comprising the steps of:
   downloading from an external server, during a first operational state of the equipment, update information for updating software of the equipment, the update information being incremental update information downloaded over a wireless interface;
   storing the downloaded update information in a flash memory by storing executable software code in a raw storage section of the flash memory different from a file system storage section and starting and controlling, during a second operational state of the equipment, the updating process according to the update information stored in the flash memory;
   obtaining, during said first operational state, an information text from the server containing information for a user on the updating process, adapting the information text to the settings of the electronic equipment using data retrieved from the file system storage section, generating a main display image at the portable radio communication equipment such that the generated main display image represents the adapted information text, compressing the main display image, and storing the compressed main display image in the flash memory before displaying the adapted information text; and displaying the main display image with the adapted information text to the user when starting the updating process and during said second operational state.

8. The method according to claim 7, comprising:
providing the first operational state of the portable radio communication equipment as a standard mode of the equipment providing all functionalities and providing a second operational state of the equipment as the basic mode of the equipment providing only few functionalities.

9. The method according to claim 7, comprising:
determining a language of the portable radio communication equipment and obtaining the information text in the determined language.

10. The method according to claim 7, comprising:
obtaining the information text from a text database integrated in the storage of the portable radio communication equipment.

11. The method according to claim 7, comprising:
adapting the information text to a font definition of the portable radio communication equipment.

12. The method according to claim 7, comprising:
accessing the main storage section of the flash memory and displaying the main display image to the user.

13. The portable radio communication equipment according to claim 1,
wherein the downloader stores the adapted information text in the raw storage section of the flash memory.

* * * * *